US011310693B2

(12) United States Patent
ElArabawy et al.

(10) Patent No.: US 11,310,693 B2
(45) Date of Patent: Apr. 19, 2022

(54) SWITCHING SCHEME FOR OPTING IN AND OUT OF MULTI-USER ORTHOGONAL FREQUENCY-DIVISION MULTIPLE ACCESS

(71) Applicant: Google LLC, Mountain View, CA (US)

(72) Inventors: Ahmed Ibrahim ElArabawy, San Diego, CA (US); Ning Zhang, Saratoga, CA (US); Kai Shi, San Jose, CA (US)

(73) Assignee: Google LLC, Mountain View, CA (US)

( * ) Notice: Subject to any disclaimer, the term of this patent is extended or adjusted under 35 U.S.C. 154(b) by 83 days.

(21) Appl. No.: 16/713,956

(22) Filed: Dec. 13, 2019

(65) Prior Publication Data

US 2021/0185592 A1 Jun. 17, 2021

(51) Int. Cl.
| | |
|---|---|
| *H04W 28/02* | (2009.01) |
| *H04L 5/00* | (2006.01) |
| *H04L 27/26* | (2006.01) |
| *H04W 28/06* | (2009.01) |
| *H04W 48/06* | (2009.01) |
| *H04W 72/04* | (2009.01) |
| *H04B 7/0452* | (2017.01) |
| *H04W 84/12* | (2009.01) |

(52) U.S. Cl.
CPC ...... *H04W 28/0289* (2013.01); *H04B 7/0452* (2013.01); *H04L 5/0007* (2013.01); *H04L 5/0037* (2013.01); *H04L 5/0055* (2013.01); *H04L 27/2602* (2013.01); *H04W 28/06* (2013.01); *H04W 48/06* (2013.01); *H04W 72/0453* (2013.01); *H04W 84/12* (2013.01)

(58) Field of Classification Search
CPC .................................................. H04W 28/0289
See application file for complete search history.

(56) References Cited

U.S. PATENT DOCUMENTS

| 7,099,622 B2 | 8/2006 | Meyer et al. |
| 2012/0263055 A1 | 10/2012 | Liu et al. |
| | (Continued) | |

FOREIGN PATENT DOCUMENTS

| CN | 106211254 | 12/2016 |
| CN | 107148060 | 9/2017 |
| | (Continued) | |

OTHER PUBLICATIONS

"International Search Report and Written Opinion", Application No. PCT/US2020/043240, dated Nov. 27, 2020, 19 pages.

(Continued)

*Primary Examiner* — Jason E Mattis
(74) *Attorney, Agent, or Firm* — Colby Nipper PLLC

(57) ABSTRACT

This document describes methods, devices, systems, and means for a switching scheme for opting in and out of multi-user orthogonal frequency-division multiple access (MU-OFDMA). In one aspect, an electronic device enters the MU-OFDMA mode to communicate via a wireless network over a shared-channel bandwidth. During the MU-OFDMA mode, the electronic device determines that an uplink-queue size is greater than a first threshold size. Responsive to the determining, the electronic device opts out of the MU-OFDMA mode and enters a single-user mode to contend for a transmit channel for transmitting uplink data.

20 Claims, 5 Drawing Sheets

(56) References Cited

U.S. PATENT DOCUMENTS

| | | | |
|---|---|---|---|
| 2016/0255537 A1* | 9/2016 | Uchino | H04W 28/0278 |
| | | | 370/329 |
| 2016/0330755 A1* | 11/2016 | Ding | H04W 72/121 |
| 2016/0360443 A1* | 12/2016 | Hedayat | H04B 7/0404 |
| 2016/0374019 A1* | 12/2016 | Park | H04L 5/0053 |
| 2017/0237532 A1 | 8/2017 | Li et al. | |
| 2017/0273140 A1* | 9/2017 | Ryu | H04W 74/004 |
| 2017/0331529 A1 | 11/2017 | Lee et al. | |
| 2018/0132278 A1 | 5/2018 | Oteri et al. | |
| 2018/0198726 A1 | 7/2018 | Baron et al. | |

FOREIGN PATENT DOCUMENTS

| | | |
|---|---|---|
| WO | 2019028785 | 2/2019 |
| WO | 2019233492 | 12/2019 |

OTHER PUBLICATIONS

"Invitation to Pay Additional Fees", Application No. PCT/US2020/043240, dated Sep. 23, 2020, 10 pages.

Pius, et al., "Seamless Wireless Connection Switching on a Mobile Device", Nov. 4, 2020, 8 pages.

* cited by examiner

SWITCHING SCHEME FOR OPTING IN AND OUT OF MULTI-USER ORTHOGONAL FREQUENCY-DIVISION MULTIPLE ACCESS

BACKGROUND

Institute of Electrical and Electronics Engineers (IEEE) has developed a new standard called 802.11ax, which boosts Wi-Fi performance by implementing several schemes including multi-user orthogonal frequency-division multiple access (MU-OFDMA). In MU-OFDMA, channel bandwidth is shared among multiple users in both uplink and downlink transmissions. To achieve a target high efficiency, an 802.11ax access point aims to maximize the time used by devices in MU-OFDMA over the time used by the devices in a single-user (SU) mode. This target high efficiency is achieved by the access point forcing the devices to be less competitive in the medium contention window and wait for triggers sent by the access point by using a more-relaxed set of Enhanced Multimedia Distributed Control Access (EDCA) parameters relative to those used by the access point.

For example, the access point sends to an 11ax device (e.g., a device configured for 802.11ax), a MU-EDCA Parameter Set information element in management frames including beacon, probe response, associate response, and re-associate response. This information element includes a new set of values of EDCA (e.g., Arbitration Inter-Frame Spacing Number (AIFSN), Exponent form of Minimum Contention Window (ECWmin), and Exponent form of Maximum Contention Window (ECWmax)) for each access category. Those values are more relaxed than the initial set passed in the EDCA Parameter Set element. The MU-EDCA Parameter Set information element also includes a timer value for how long these parameters take effect (e.g., MU-EDCA Timer).

The 11ax device participating in MU-OFDMA would have to wait for triggers from the access point and abide by a scheduling algorithm in the access point for transmitting uplink traffic (e.g., uplink data and control signals). However, a legacy device would contend more aggressively to obtain the channel and would get full access to the bandwidth of the channel for its transmission. This makes the 11ax device participating in MU-OFDMA more inferior to legacy devices in high-traffic load scenarios.

SUMMARY

This summary is provided to introduce simplified concepts of a switching scheme for opting in and out of multi-user orthogonal frequency-division multiple access (MU-OFDMA). In one example, an electronic device can opt out of an MU-OFDMA mode ("multi-user mode") when uplink traffic is high (e.g., above a threshold), which allows the electronic device to enter a single-user mode to maximize throughput by transmitting its uplink data without sharing channel bandwidth with other devices and without access restrictions mandated by the access point. In another example, the electronic device can opt out of the MU-OFDMA mode if low-latency requirements are critical, such as for an online gaming application, and if the access point is not responsive enough to meet those requirements. In yet another example, the electronic device can opt out of the MU-OFDMA mode based on Basic Service Set (BSS) metrics, such as if the electronic device estimates, based on a signal-strength measurement of a transmit channel, that the transmit channel can handle more data than the access point is allowing the electronic device to transmit under the multi-user mode. Opting out of the multi-user mode enables the electronic device to enter the single-user mode and contend for the transmit channel without any restrictions mandated by the access point.

The simplified concepts are further described below in the Detailed Description. This summary is not intended to identify essential features of the claimed subject matter nor is it intended for use in determining the scope of the claimed subject matter.

BRIEF DESCRIPTION OF THE DRAWINGS

The details of one or more aspects of a switching scheme for opting in and out of MU-OFDMA are described below. The use of the same reference numbers in different instances in the description and the figures indicate similar elements.

DETAILED DESCRIPTION

Overview

Figure 1:
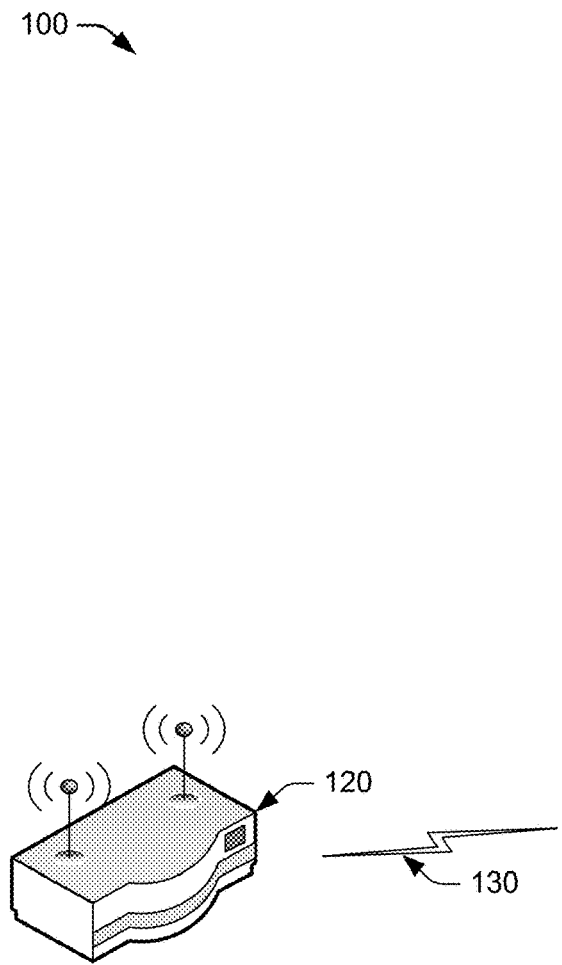
FIG. 1 illustrates an example environment, which includes one or more electronic devices and a Wi-Fi access point.
Figure 1:
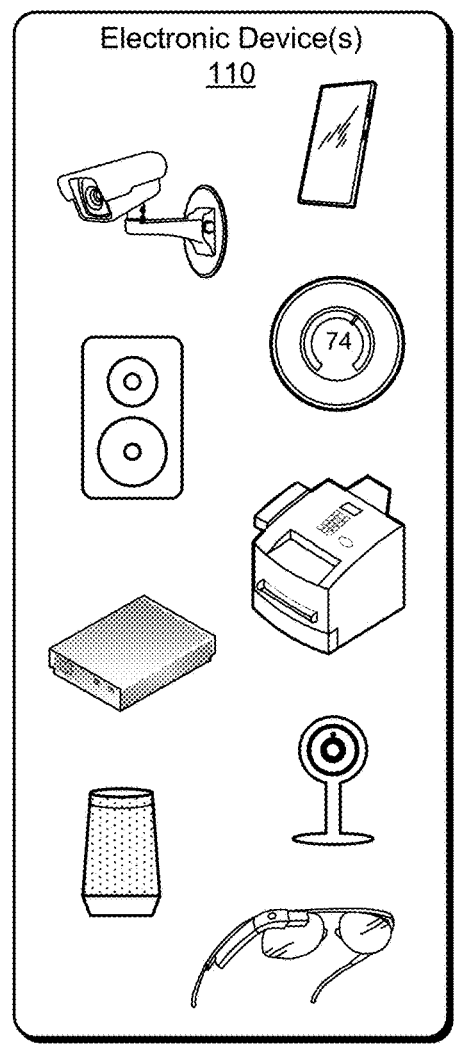

This document describes methods, devices, systems, and means for a switching scheme for opting in and out of multi-user orthogonal frequency-division multiple access (MU-OFDMA). Conventional techniques used to achieve high efficiency and utilization of MU-OFDMA cause 11ax electronic devices (e.g., devices configured for 802.11ax) participating in MU-OFDMA to be inferior to legacy devices in heavy-traffic load scenarios because the 11ax devices are forced to be less competitive in the medium contention window and wait for triggers sent by the access point(s). Techniques are described to balance between preserving high efficiency in low-traffic (non-critical latency) scenarios for overall Basic Service Set (BSS) efficiency and being as aggressive in contention when data load or latency requirements are critical. Thus, the techniques described herein are directed to a switching scheme for opting in and out of MU-OFDMA.

In one aspect, a method for opting in or out of an MU-OFDMA mode is disclosed. The method includes an electronic device entering the MU-OFDMA mode to communicate via a wireless network over a shared-channel bandwidth. In addition, the method includes, during the MU-OFDMA mode, determining that an uplink-queue size is greater than a first threshold size. The method also includes, responsive to the determining, opting out of the MU-OFDMA mode and entering a single-user mode to contend for a transmit channel for transmitting uplink data.

In another aspect, an electronic device is disclosed. The electronic device includes a memory and processor system configured to execute instructions stored in the memory to implement an access-mode manager application configured to manage transmission and reception of signals over a wireless network according to an MU-OFDMA mode. The access-mode manager application is also configured to enter a low-latency mode for transmission of uplink data for an application. In addition, the access-mode manager application is configured to, during the MU-OFDMA mode and the low-latency mode of the electronic device, monitor a frequency at which triggers are received from an access point on the wireless network to determine whether to continue using the MU-OFDMA mode or to opt out of the MU-OFDMA mode.

In another aspect, a method for opting out of an MU-OFDMA mode is disclosed. The method is performed by an electronic device and includes, when connected to a wireless network using the MU-OFDMA mode, indicating to an access point of the wireless network that the electronic device has uplink data to transmit. The method also includes receiving one or more triggers from the access point for transmitting the uplink data, the one or more triggers including a mandated modulation and coding scheme (MCS). In addition, the method includes performing a clear channel assessment (CCA) of a transmit channel, measuring a signal strength of the transmit channel, estimating an MCS based on the measured signal strength, and comparing a first data rate associated with the estimated MCS to a second data rate associated with the mandated MCS to determine whether to opt out of the MU-OFDMA mode.

Example Environment

FIG. 1 illustrates an example environment 100, which includes one or more electronic devices 110 and a Wi-Fi access point 120. Each of these devices may be wireless-network-enabled and capable of communicating data, packets, and/or frames over a wireless link 130. The wireless link 130 may include any suitable type of wireless communication link or wireless network connection. For example, the wireless link 130 may be implemented in whole or in part as a wireless local-area-network (WLAN), ad-hoc WLAN (e.g., a direct wireless link), wireless mesh network, near-field communication (NFC) link, wireless personal-area-network (WPAN), wireless wide-area-network (WWAN), or short-range wireless network. The wireless link 130 may be implemented in accordance with any suitable communication protocol or Institute of Electrical and Electronics Engineers (IEEE) standard, such as IEEE 802.11-2012, IEEE 802.11-2016, IEEE 802.11ac, IEEE 802.11ad, IEEE 802.11ah, IEEE 802.11ax, and the like. By using IEEE 802.11ax, the electronic device 110 can operate in radio bands between, and including, 1 and 6 GHz, such as 2.4 GHz, 5 GHz, and 6 GHz radio bands.

In this example, the access point 120 is implemented to provide and manage a wireless network that includes the wireless link 130. The wireless links 130 may be implemented with any suitable modulation and coding scheme (MCS), such as orthogonal frequency division multiplexing access (OFDMA). In other cases, the access point 120 may include or be embodied as a host device, enhanced node base station, wireless router, broadband router, modem device, drone controller, vehicle-based network device, or other network administration node or device. Using IEEE 802.11ax, the access point 120 may provide multiple Wi-Fi networks, a 2.4 GHz Wi-Fi network ("AP2G"), a 5 GHz Wi-Fi network ("AP5G"), and/or a 6 GHz Wi-Fi network ("AP6G"). The electronic device 110 may detect both Wi-Fi networks using a multi-user (MU) OFDMA mode. The electronic device may also have Multiple Input Multiple Output (MIMO) capabilities.

The electronic device(s) 110 operate as stations in the wireless network provided by the access point 120. The electronic device 110 may include a smart-phone, set-top box, tablet computer, a wireless speaker, a wireless smart-speaker, a camera, a wearable device, a wireless printer, a mobile station, a laptop computer, a medical device, a security system, a drone, an Internet-of-Things (IoT) device, a gaming device, a smart appliance, an Internet-protocol enabled television (IP TV), a personal media device, a navigation device, a mobile-internet device (MID), a network-attached-storage (NAS) drive, a mobile gaming console, and so on.

Generally, the access point 120 provides connectivity to the Internet, other networks, or network-resources through a backhaul link (not shown), which may be either wired or wireless (e.g., a T1 line, fiber optic link, broadband cable network, intranet, a wireless-wide-area network). The backhaul link may include or connect with data networks operated by an internet service provider, such as a digital subscriber line or broadband cable provider, and may interface with the access point 120 via an appropriately configured modem (not shown). While associated with the wireless network provided by the access point 120 (e.g., via the wireless links 130), the electronic device(s) 110 may access the Internet, exchange data with each other, or access other networks for which the access point 120 acts as a gateway.

Example Devices

Figure 2:
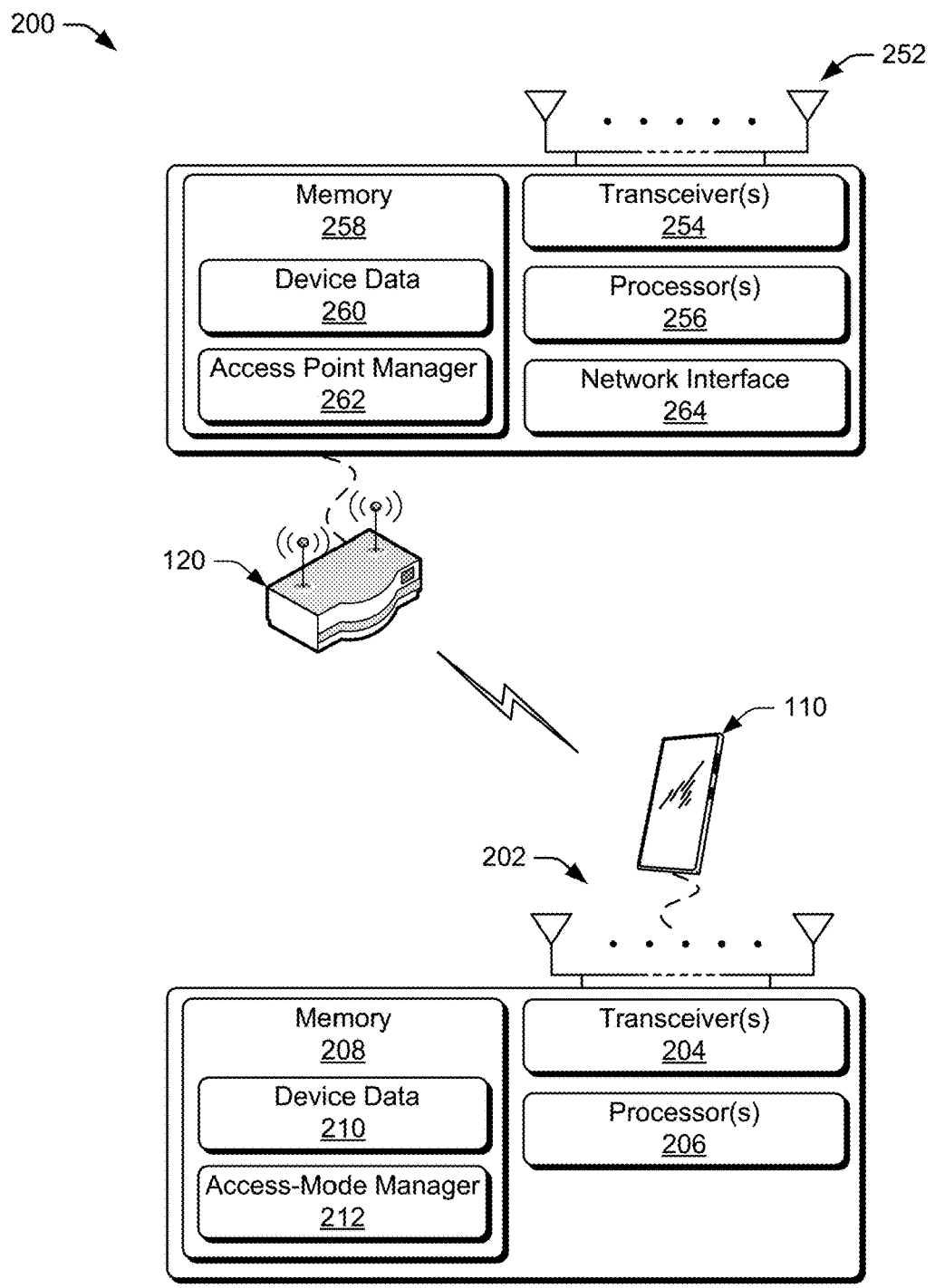
FIG. 2 illustrates an example device diagram of an access point and an electronic device in more detail.

FIG. 2 illustrates an example device diagram 200 of an access point and an electronic device in more detail. In aspects, the device diagram 200 describes devices that can implement various aspects of a switching scheme for opting in and out of MU-OFDMA. The electronic device(s) 110 operates as a station (STA) in the wireless network provided by the access point 120. As a station, the electronic device 110 includes one or more antennas 202 and one or more transceivers 204 for communicating with the access point 120 or other wirelessly-enabled devices. The transceivers 204 may include any suitable number of respective communication paths (e.g., transmit or receive chains) to support transmission or reception of multiple spatial streams of data. Front-end circuitry (not shown) of the electronic device(s) 110 may couple or connect the transceiver 204 to the antennas 202 to facilitate various types of wireless communication. The antennas 202 may include an array of multiple antennas that are configured similar to or differently from each other.

The electronic device(s) 110 also includes processor(s) 206 and memory 208 (computer-readable storage media 208, CRM 208). The processor(s) 206 may be a single core processor or a multiple core processor composed of a variety of materials, such as silicon, polysilicon, high-K dielectric, copper, and so on. The computer-readable storage media described herein excludes propagating signals. CRM 208 may include any suitable memory or storage device such as random-access memory (RAM), static RAM (SRAM), dynamic RAM (DRAM), non-volatile RAM (NVRAM), read-only memory (ROM), or Flash memory useable to store device data 210 of the electronic device(s) 110. The device data 210 includes user data, multimedia data, applications, and/or an operating system of the electronic device(s) 110 that are executable by processor(s) 206 to enable wireless communication and user interaction with the electronic device(s) 110. In the context of the disclosure, the CRM 208 is implemented as storage media, and thus does not include transitory signals or carrier waves.

CRM 208 also includes an access-mode manager 212 (e.g., access-mode manager application 212). Alternately or additionally, the access-mode manager 212 may be implemented in whole or part as hardware logic or circuitry integrated with or separate from other components of the electronic device(s) 110. In at least some aspects, the access-mode manager 212 configures the transceiver(s) 204 to implement the techniques described herein for a switching scheme for opting in and out of MU-OFDMA.

The access point 120 includes one or more antennas 252 and one or more transceivers 254 for communicating with the electronic device(s) 110 or other wirelessly-enabled devices. The transceivers 254 may include any suitable number of respective communication paths (e.g., transmit or receive chains) to support transmission or reception of multiple spatial streams of data. Front-end circuitry (not shown) of the access point 120 may couple or connect the transceiver 254 to the antennas 252 to facilitate various types of wireless communication. The antennas 252 may include an array of multiple antennas that are configured similar to or different from each other.

The access point 120 also includes processor(s) 256 and memory 258 (computer-readable storage media 258, CRM 258). The processor(s) 256 may be a single-core processor or a multiple-core processor composed of a variety of materials, such as silicon, polysilicon, high-K dielectric, copper, and so on. The computer-readable storage media described herein excludes propagating signals. CRM 258 may include any suitable memory or storage device such as random-access memory (RAM), static RAM (SRAM), dynamic RAM (DRAM), non-volatile RAM (NVRAM), read-only memory (ROM), or Flash memory useable to store device data 260 of the access point 120. The device data 260 includes applications, and/or an operating system of the access point 120 that are executable by processor(s) 256 to enable wireless communication with the electronic device(s) 110. In the context of the disclosure, the CRM 258 is implemented as storage media, and thus does not include transitory signals or carrier waves.

CRM 258 also includes an access point manager 262 (access point manager application 262). Alternately or additionally, the access point manager 262 may be implemented in whole or part as hardware logic or circuitry integrated with or separate from other components of the access point 120. In at least some aspects, the access point manager 262 configures the transceiver(s) 254 to implement the techniques described herein for a switching scheme for opting in and out of MU-OFDMA. The access point manager 262 also configures a network interface 264 to relay communications between the electronic device(s) 110, the access point 120, and an external network.

Example Methods

Example methods 300, 400, and 500 are described with reference to FIGS. 3-5, respectively, in accordance with one or more aspects of a switching scheme for opting in and out of MU-OFDMA. The order in which the method blocks of methods 300, 400, and 500 are described is not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
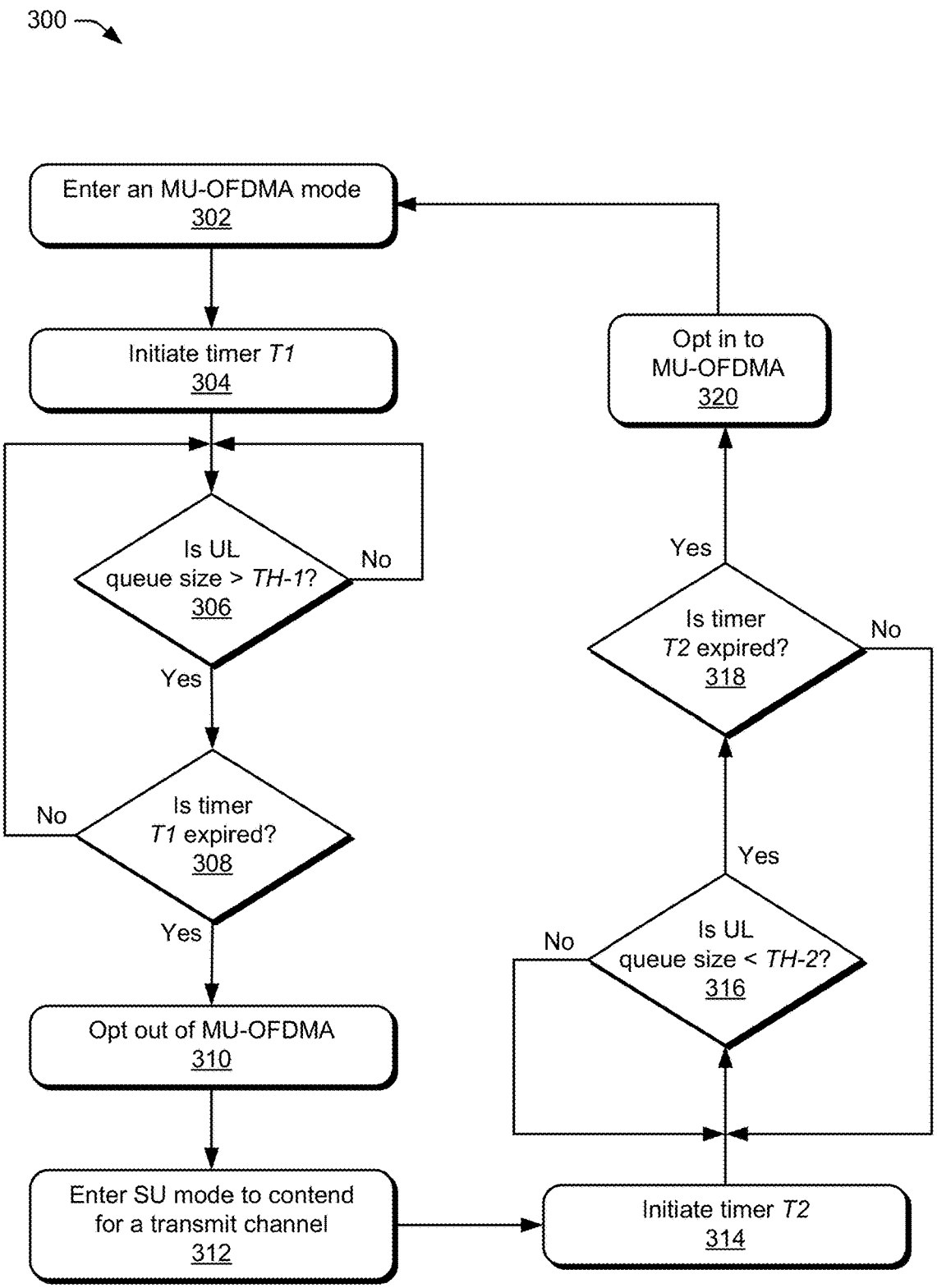
FIG. 3 depicts an example method for opting in and out of MU-OFDMA when uplink traffic is high.

FIG. 3 depicts an example method 300 for opting in and out of MU-OFDMA when uplink traffic is high. During periods of high uplink traffic, it may be more efficient for the electronic device 110 to opt out of MU-OFDMA rather than sharing the bandwidth of a transmit channel with other devices. At 302, an electronic device enters an MU-OFDMA mode for communicating with an access point via a wireless network over a shared-channel bandwidth. For example, an electronic device (e.g., the electronic device 110) transmits an Operation Mode Indication (OMI) to an access point (e.g., the access point 120) to request initiation of the MU-OFDMA mode. The access point controls and synchronizes uplink transmissions of multiple electronic devices in the MU-OFDMA mode to enable simultaneous multiple-user transmissions to occur.

At 304, the electronic device initiates a timer T1 (e.g., a first timer T1). The timer T1 may be any suitable timing mechanism and may be set to any suitable length of time, such as approximately 500 milliseconds (ms). The timer T1 is used to provide a minimum amount of time in which the electronic device 110 remains in the MU-OFDMA mode before switching to a different mode, such as the single-user mode.

At 306, the electronic device 110 determines if an uplink (UL) queue size is greater than a first threshold size TH-1 for the uplink queue. The uplink-queue size may provide an indication of high or low uplink traffic. An example threshold size may include a threshold size substantially equal to a size of a transmit channel, approximately two megabytes (MB) of data, or any other suitable size. In one implementation, the electronic device 110 uses the first threshold size TH-1 to determine if the uplink data is sufficient to fill the entire transmit channel. If the channel can be filled by the uplink data, then no efficiency is lost by not sharing bandwidth of the transmit channel according to the multi-user mode.

If the uplink-queue size is not greater than the first threshold size TH-1 (e.g., "NO" at 306), then the electronic device 110 continues to monitor the size of the uplink queue. If the uplink-queue size is greater than the first threshold size TH-1 ("YES" at 306), then at 308 the electronic device determines if the timer T1 is expired. If the timer T1 is not yet expired ("NO" at 308), then the electronic device 110 continues to monitor the uplink-queue size relative to the first threshold size TH-1 at 306. The timer T1 prevents the electronic device 110 from opting out of the MU-OFDMA mode too quickly after entering the MU-OFDMA mode.

If the timer T1 is expired ("YES" at 308), then at 310 the electronic device 110 opts out of the MU-OFDMA mode. Opting out of the multi-user mode enables the electronic device 110 to not be limited to requirements of the access point under the multi-user mode. In an example, the electronic device 110 can send an OMI signal to the access point 120 to indicate that the electronic device is selecting to exit the MU-OFDMA mode and contend for the transmit channel in a single-user mode. In particular, the electronic device 110 can send a frame with an OM Control subfield having an uplink MU Disable subfield set to one (1), or having the uplink MU Disable subfield set to zero (0) and an uplink MU Data Disable subfield set to one (1). The electronic device 110 can receive an acknowledgment signal (e.g., ACK) from the access point 120 indicating that the MU-OFDMA mode is disabled for the electronic device 110. When this frame is acknowledged by the access point, the electronic device can ignore the MU-OFDMA EDCA parameter set, which is mandated by the access point and may have relaxed values in comparison to standard EDCA parameters included in an initial EDCA parameter set information element used by the access point. The electronic device 110 may then apply the standard EDCA parameters included in the initial EDCA parameter set information element, which do not have relaxed values.

At 312, the electronic device 110 enters the single user (SU) mode to contend for the transmit channel. The single-user mode enables the electronic device to contend for the transmit channel using different parameters than the parameters mandated by the access point as part of the multi-user mode, enabling the electronic device 110 to contend for the transmit channel as aggressively as a legacy device and/or the access point 120.

At 314, the electronic device 110 initiates a timer T2 (e.g., a second timer T2) in response to entering the single-user mode. The timer T2 may be set for any suitable duration of time, such as approximately 500 ms. The timer T2 may prevent the electronic device 110 from exiting the single-user mode too quickly, essentially ping-ponging back and forth between the multi-user mode and the single-user mode. Accordingly, the timer T2 provides a minimum amount of time for the electronic device 110 to operate in the single-user mode before it can attempt to re-enter the multi-user mode.

At 316, the electronic device 110 determines if the uplink-queue size is below a second threshold size TH-2. An example of the second threshold size TH-2 may include a threshold size substantially equal to half the size of a transmit channel, approximately one MB of data, or any other suitable size. The first threshold size TH-1 and the second threshold size TH-2 may be based on an access category (e.g., voice, video, best effort, and background access categories) of the uplink data, such that each threshold may differ for different access categories. For example, the first and second threshold sizes TH-1 and TH-2 can differ based on whether the uplink data is for Voice-over-Internet Protocol (VoIP), online gaming, audio data, video data, etc. In addition, in each access category, the first and second threshold sizes TH-1 and TH-2 can differ. An example implementation includes, for the voice access category, the first threshold size TH-1 set to one kilobyte (KB) and the second threshold size TH-2 set to 0.2 KB. In another implementation, for the video access category, the first threshold size TH-1 may be set to 10 KB and the second threshold size TH-2 may be set to 2 KB. An example implementation for the best effort and background access categories may include the first threshold size TH-1 set to 2 MB and the second threshold size TH-2 set to 1 MB. In another example, the first and second thresholds TH-1 and TH-2 may be dependent on the maximum latency in an uplink queue, such that each threshold may differ for different maximum latencies in uplink queues. Although several examples are described herein, any suitable threshold size may be used for the first and second threshold sizes TH-1 and TH-2, and the sizes may depend on the implementation. These examples are not intended to be limiting.

If the uplink-queue size is equal to, or greater than, the second threshold size TH-2 ("NO" at 316), then the electronic device 110 remains in the single-user mode for transmitting uplink data. However, if the uplink-queue size drops below the second threshold size TH-2, then it is likely that the uplink traffic is sufficiently low to allow the multi-user mode to be more efficient for the electronic device 110 than the single-user mode. Accordingly, if the electronic device 110 determines that the uplink-queue size has decreased to a size that is less than the second threshold size TH-2 ("YES" at 316), then at 318, the electronic device 110 determines if the timer T2 is expired, which indicates that a sufficient amount of time has passed since entering the single-user mode. Alternatively, the electronic device 110 can wait until the timer T2 expires before determining whether the uplink-queue size is equal to, or greater than, the second threshold size TH-2.

If the timer T2 is not expired ("NO" at 318), then the electronic device 110 remains in the single-user mode for transmitting uplink data. Accordingly, the electronic device 110 delays opting back in to the MU-OFDMA mode until expiration of the timer T2. If the timer T2 is expired ("YES" at 318), then it is determined that the electronic device 110 has spent a sufficient amount of time in the single-user mode, and the electronic device 110 may proceed to opt in to the multi-user mode.

Other forms of hysteresis can be implemented between the two threshold sizes TH-1 and TH-2 to reduce or prevent ping-ponging between the multi-user and single-user modes. For example, instead of using the timer T2 (or in addition to using the timer T2), the electronic device 110 can wait for the uplink-queue size to fall below the second threshold size TH-2 by a predefined amount (e.g., value or percentage) before determining whether to opt in to the multi-user mode. A third threshold size can be used that is less than the second threshold size TH-2 by the predefined amount. This additional condition may further reduce the likelihood of the electronic device 110 bouncing back and forth between single-user and multi-user modes.

At 320, the electronic device 110 opts in to the MU-OFDMA mode. This can be achieved by the electronic device 110 transmitting an OMI signal, to the access point 120, requesting to participate in the multi-user mode. The electronic device 110 receives an acknowledgment signal, from the access point 120, providing permission and information to enter the multi-user mode. The electronic device 110 can then re-enter the MU-OFDMA mode at 302.

Figure 4:
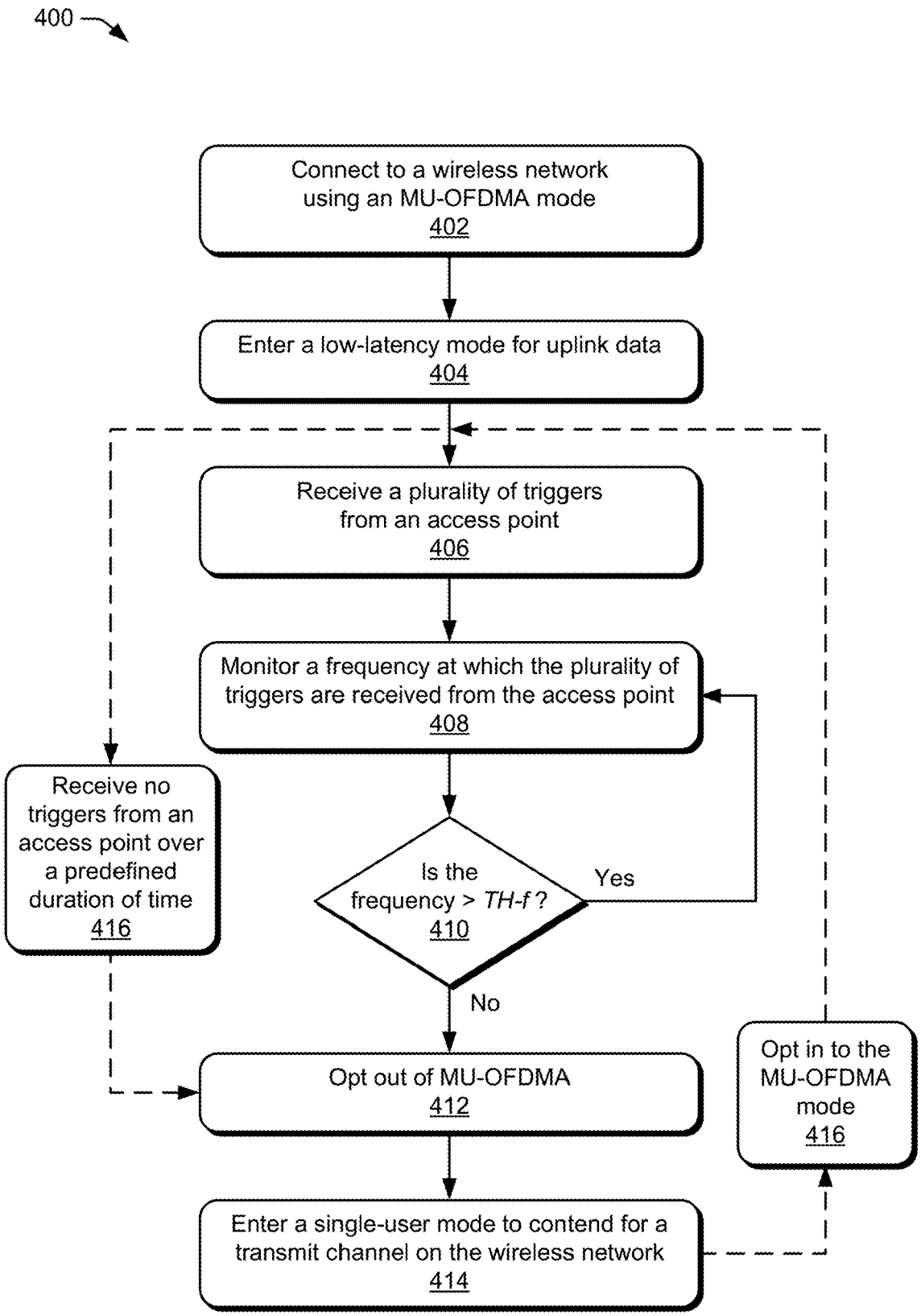
FIG. 4 depicts an example method for opting out of MU-OFDMA to honor low-latency Quality-of-Service (QoS) requirements.

FIG. 4 illustrates an example method 400 for opting out of MU-OFDMA to honor low-latency Quality-of-Service (QoS) requirements. The method 400 may be performed by the electronic device 110 when implementing a low-latency application that requires quick access to uplink and downlink channels. At 402, an electronic device (e.g., the electronic device 110) connects to a wireless network using an MU-OFDMA mode.

At 404, the electronic device 110 enters a low-latency mode for uplink traffic. The electronic device 110 may enter the low-latency mode when performing functions or executing an application having data load or latency requirements that are critical, such as online gaming.

At 406, the electronic device 110 receives a plurality of triggers from an access point (e.g., the access point 120). Triggers (e.g., trigger frames) are used by the access point 120 to schedule multi-user transmissions in both uplink and downlink directions. The access point 120 acts as a central coordinating entity and assigns time-frequency resource units (RUs) for reception or transmission to associated stations, which avoids RU contention overhead and increases efficiency in scenarios of dense deployments. For example, the access point 120 (Wifi AP) sends a downlink trigger frame to inform particular stations to send their data. The trigger frame includes information identifying a transmission interval, a bit rate of transmission, and a transmit power for the station (the electronic device(s) 110) to use for the uplink transmission. The information in the trigger is defined in the 802.11ax specification.

At 408, the electronic device 110 monitors a frequency at which the triggers are received from the access point 120. In particular, the electronic device 110 monitors an average inter-arrival time of the triggers received from the access point 120.

At 410, the electronic device 110 determines if the frequency is greater than a threshold frequency TH-f. Any suitable threshold frequency TH-f can be used as a measure for an acceptable frequency for the triggers. In some aspects, the threshold frequency TH-f can be based on a type of application being used (e.g., VoIP application, online gaming application, etc.), a type of data (e.g., voice traffic, video data, audio data, etc.), or a particular access category of the uplink data. If the frequency is greater than the threshold frequency TH-f ("YES" at 410), then the electronic device 110 maintains the MU-OFDMA mode and continues to monitor the frequency at 408. The threshold frequency TH-f may represent a maximum queuing delay. When the frequency of the triggers is greater than the threshold frequency TH-f, then the triggers are being sent by the access point 120 fast enough to retain high efficiency in the multi-user mode.

If the frequency is less than the threshold frequency TH-f ("NO" at 410), then at 412, the electronic device 110 opts out of the MU-OFDMA mode. When the frequency of the triggers drops below the threshold frequency TH-f, the electronic device 110 can determine that, for some reason, the access point 120 is not responsive enough for the low-latency requirements. Delayed triggers result in more transmission delay. Accordingly, to improve efficiency, the electronic device 110 can select to opt out of the MU-OFDMA mode.

At 414, the electronic device 110 enters a single-user mode to contend for a transmit channel on the wireless network without restrictions mandated by the access point. As above, the single-user mode (after opting out of the multi-user mode) enables the electronic device 110 to avoid scheduling and shared-channel bandwidth requirements set by the access point for the multi-user mode. Further, by opting out of the multi-user mode and switching to the single-user mode, the electronic device 110 avoids being penalized on latency, which would occur if the electronic device 110 did not opt out of the multi-user mode and simply used a relaxed set of contention parameters provided by the access point 120.

In some scenarios, after entering the low-latency mode at 404, the electronic device 110 may, at 416, receive no triggers from the access point over a predefined duration of time, or may receive only a single trigger over the duration of time. In such scenarios, the method 400 proceeds directly from 416 to 412 to opt out of the MU-OFDMA mode.

As latency requirements are relaxed, or after a predefined period of time, the electronic device 110 can optionally, at 418, opt back in to the MU-OFDMA mode. Then the method 400 may proceed to receiving triggers (at 406), or not receiving triggers (at 416), and monitoring (at 408) the frequency at which the triggers are received from the access point 120.

Figure 5:
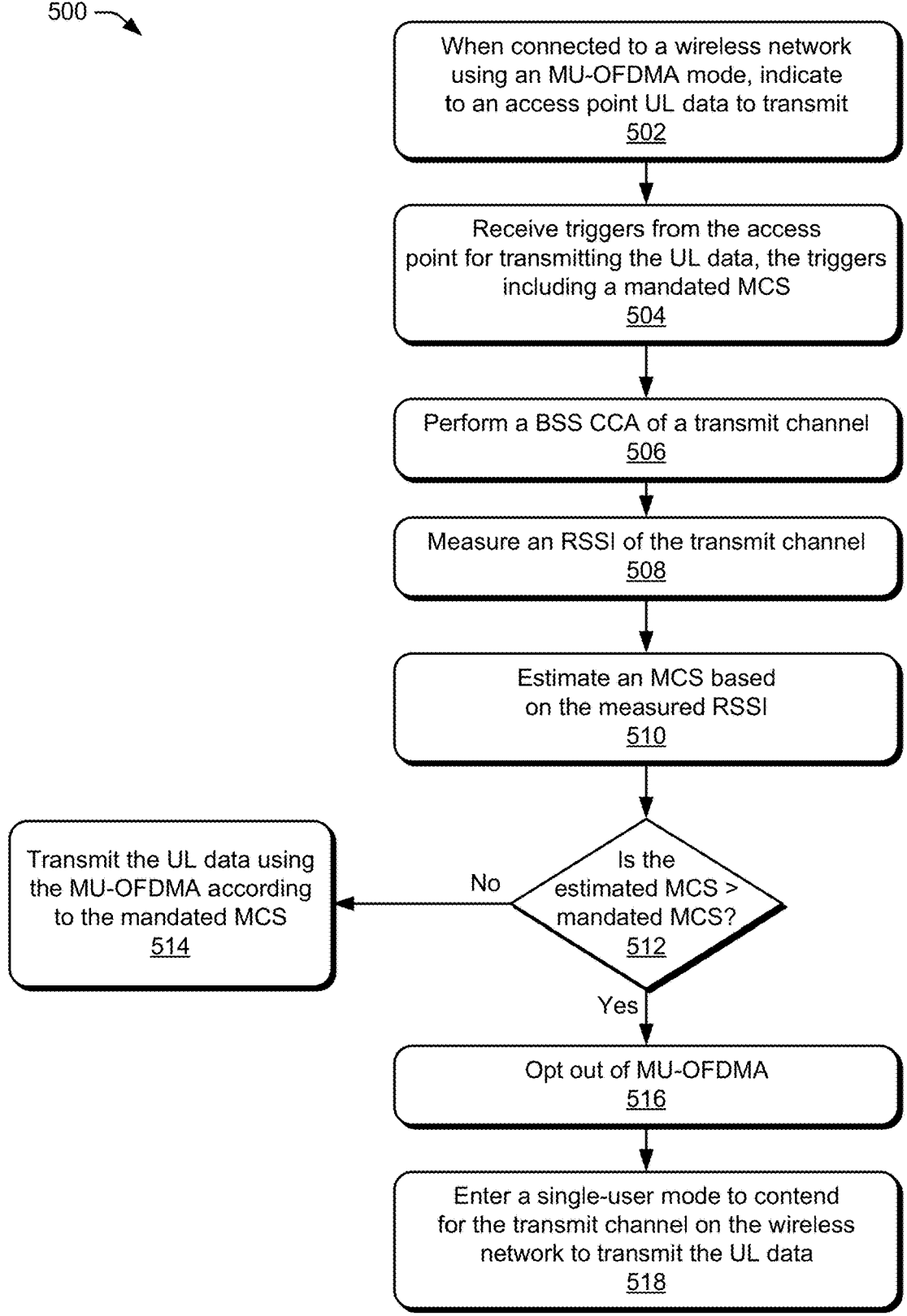
FIG. 5 depicts an example method for opting out of MU-OFDMA based on Basic Service Set (BSS) metrics.

FIG. 5 illustrates an example method 500 for opting out of MU-OFDMA based on Basic Service Set (BSS) metrics. At 502, when connected to a wireless network using an MU-OFDMA mode, the electronic device 110 indicates to an access point of the wireless network uplink data to transmit.

At 504, the electronic device 110 receives one or more triggers from the access point for transmitting the uplink data. In an example, the triggers include a mandated modulation and coding scheme (MCS) provided by the access point.

At 506, the electronic device 110 performs a BSS clear channel assessment (CCA) of a transmit channel. A BSS CCA Busy is a Wi-Fi metric indicating how busy or clear the air time of a channel is. The electronic device 110 can monitor the channel busy time over a duration of time to obtain this metric. For example, the electronic device 110 listens for radio frequency (RF) transmissions at a physical layer of an air interface. The electronic device 110 uses a signal-detect threshold to identify a preamble transmission from another transmitting radio (e.g., the access point 120) for synchronization between devices. In addition, the electronic device 110 uses an energy-detect threshold to detect other types of RF transmissions during the CCA.

At 508, the electronic device 110 measures a received signal strength indicator (RSSI) of the transmit channel if the transmit channel is clear. This measurement provides an indication as to the quality of the signal on the transmit channel, which is in turn an indication of how fast the electronic device 110 can transmit data.

At 510, the electronic device 110 estimates an MCS based on the measured RSSI. The estimated MCS indicates how many bits the electronic device 110 can transmit per symbol on the transmit channel.

At 512, the electronic device 110 determines if a data rate associated the estimated MCS is greater than a data rate associated with the mandated MCS. In some aspects, the electronic device 110 can determine if the data rate associated with the estimated MCS is greater than the data rate associated with the mandated MCS by a threshold amount T. The MCS is an index to an array of rates, such that a higher MCS corresponds to a higher rate, and a lower MCS corresponds to a lower rate.

If the data rate associated with the estimated MCS is less than the data rate associated with the mandated MCS ("NO" at 512), then at 514, the electronic device 110 remains in the MU-OFDMA mode and transmits the uplink data using the MU-OFDMA mode according to the mandated MCS. In some aspects, the method 500 may proceed to 514 if the electronic device 110 determines that the data rate associated with the estimated MCS is greater than the data rate associated with the mandated MCS, but the difference between the data rates is less than the threshold amount T.

If the data rate associated with the estimated MCS is greater than the data rate associated with the mandated MCS ("YES" at 512), then at 516, the electronic device 110 opts out of the MU-OFDMA mode. Alternatively, the electronic device 110 opts out of the MU-OFDMA mode at 516 if the data rate associated with the estimated MCS is greater than the data rate associated with the mandated MCS by at least the threshold amount T.

At 518, the electronic device 110 enters a single-user mode to contend for the transmit channel on the wireless network for transmission of the uplink data without restrictions mandated by the access point 120.

CONCLUSION

Although aspects of a switching scheme for opting in and out of MU-OFDMA have been described in language specific to features and/or methods, the subject of the appended claims is not necessarily limited to the specific features or methods described. Rather, the specific features and methods are disclosed as example implementations of the switching scheme for opting in and out of MU-OFDMA, and other equivalent features and methods are intended to be within the scope of the appended claims. Further, various different aspects are described, and it is to be appreciated that each described aspect can be implemented independently or in connection with one or more other described aspects.

What is claimed is:

1. A method performed by an electronic device, the method comprising:
    entering a multi-user orthogonal frequency-division multiple access (MU-OFDMA) mode to communicate via a wireless network over a shared-channel bandwidth;
    responsive to entering the MU-OFDMA mode, initiating a first timer that defines an amount of time in which the electronic device is prevented from opting out of the MU-OFDMA mode;
    during the MU-OFDMA mode, determining that an uplink-queue size is greater than a first threshold size; and
    responsive to the determining and expiration of the first timer:
        opting out of the MU-OFDMA mode; and
        entering a single-user mode to contend for a transmit channel for transmitting uplink data.

2. The method of claim 1, wherein the opting out comprises:
    transmitting, to an access point of the wireless network, an indication to disable the MU-OFDMA mode; and
    receiving an acknowledgment signal from the access point indicating that the MU-OFDMA mode is disabled for the electronic device.

3. The method of claim 1, further comprising:
    subsequent to entering the single-user mode, determining that the uplink-queue size has decreased to a size that is less than a second threshold size; and
    responsive to the determining that the uplink-queue size has decreased to a size that is less than the second threshold, opting in to the MU-OFDMA mode.

4. The method of claim 3, wherein the opting in to the MU-OFDMA mode includes:
    transmitting a request to an access point of the wireless network to participate in the MU-OFDMA mode;
    receiving an additional acknowledgment signal to enter the MU-OFDMA mode; and
    re-entering the MU-OFDMA mode.

5. The method of claim 3, further comprising:
    initiating a second timer in response to entering the single-user mode; and
    delaying the opting in to the MU-OFDMA mode until expiration of the second timer.

6. The method of claim 3, further comprising:
    initiating a second timer in response to entering the single-user mode; and
    delaying the determining of uplink-queue size being less than a second threshold size until after the second timer expires.

7. The method of claim 3, wherein the determining of uplink-queue size being less than a second threshold size comprises determining that the uplink-queue size has decreased below a third threshold size that is less than the second threshold size.

8. The method of claim 3, wherein the first and second thresholds are based on an access category of the uplink data.

9. The method of claim 3, wherein at least one of the first threshold or the second threshold is dependent on a maximum latency in an uplink queue.

10. The method of claim 1, further comprising:
    waiting until the first timer expires before performing the determining of the uplink-queue size being greater than the first threshold size.

11. An electronic device comprising:
    a memory and a processor, the processor configured to execute instructions stored in the memory to implement an access-mode manager application configured to:
        manage transmission and reception of signals over a wireless network according to a multi-user orthogonal frequency-division multiple access (MU-OFDMA) mode;
        enter the MU-OFDMA mode to communicate via a wireless network over a shared-channel bandwidth;
        responsive to entering the MU-OFDMA mode, initiate a first timer that defines an amount of time in which the electronic device is prevented from opting out of the MU-OFDMA mode;
        during the MU-OFDMA mode, determine that an uplink-queue size is greater than a first threshold size;
        responsive to a determination that the uplink-queue size is greater than the first threshold size and expiration of the first timer:
            opt out of the MU-OFDMA mode; and
            enter a single-user mode to contend for a transmit channel for transmitting uplink data.

12. The electronic device of claim 11, wherein to opt out of the MU-OFDMA mode, the access-mode manager application is configured to:
    transmit, to an access point of the wireless network, an indication to disable the MU-OFDMA mode; and
    receive an acknowledgment signal from the access point indicating that the MU-OFDMA mode is disabled for the electronic device.

13. The electronic device of claim 11, wherein the access-mode manager application is further configured to:
    subsequent to entering the single-user mode, determine whether the uplink-queue size has decreased to a size that is less than a second threshold size; and
    responsive to a determination that the uplink-queue size has decreased to a size that is less than the second threshold, opt in to the MU-OFDMA mode.

14. The electronic device of claim 13, wherein to opt in to the MU-OFDMA mode, the access-mode manager application is configured to:
    transmit a request to an access point of the wireless network to participate in the MU-OFDMA mode;
    receive an additional acknowledgment signal to enter the MU-OFDMA mode; and
    re-enter the MU-OFDMA mode.

15. The electronic device of claim 13, wherein the access-mode manager application is further configured to:
    initiate a second timer in response to entering the single-user mode; and delay the opting in to the MU-OFDMA mode until expiration of the second timer.

16. The electronic device of claim 13, wherein the access-mode manager application is further configured to:
initiate a second timer in response to entering the single-user mode; and
delay the determination of whether the uplink-queue size has decreased to a size that is less than a second threshold size until after the second timer expires.

17. The electronic device of claim 13, wherein to determine whether the uplink-queue size has decreased to a size that is less than a second threshold size includes a determination that the uplink-queue size has decreased below a third threshold size that is less than the second threshold size.

18. The electronic device of claim 13, wherein the first and second thresholds are based on an access category of the uplink data.

19. The electronic device of claim 13, wherein at least one of the first threshold or the second threshold is dependent on a maximum latency in an uplink queue.

20. The electronic device of claim 11, wherein the access-mode manager application is further configured to wait until the first timer expires before making the determination of the uplink-queue size being greater than the first threshold size.

\* \* \* \* \*